US009183323B1

(12) United States Patent
Shaw

(10) Patent No.: US 9,183,323 B1
(45) Date of Patent: Nov. 10, 2015

(54) SUGGESTING ALTERNATIVE QUERY PHRASES IN QUERY RESULTS

(75) Inventor: Hayden Shaw, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 467 days.

(21) Appl. No.: 12/163,925

(22) Filed: Jun. 27, 2008

(51) Int. Cl.
    *G06F 7/00* (2006.01)
    *G06F 17/30* (2006.01)

(52) U.S. Cl.
    CPC .................................. *G06F 17/3097* (2013.01)

(58) Field of Classification Search
    USPC ........................................................ 707/766
    See application file for complete search history.

(56) References Cited

U.S. PATENT DOCUMENTS

| | | |
|---|---|---|
| 5,544,281 A | 8/1996 | Maruoka et al. |
| 5,563,960 A | 10/1996 | Shapiro |
| 5,642,522 A | 6/1997 | Zaenen et al. |
| 5,746,392 A | 5/1998 | Gast |
| 5,748,851 A | 5/1998 | Iokibe et al. |
| 5,841,890 A | 11/1998 | Kraske |
| 5,952,957 A | 9/1999 | Szu |
| 5,982,370 A | 11/1999 | Kamper |
| 5,987,457 A | 11/1999 | Ballard |
| 6,005,565 A | 12/1999 | Legall et al. |
| 6,006,225 A | 12/1999 | Bowman et al. |
| 6,212,524 B1 | 4/2001 | Weissman et al. |
| 6,236,684 B1 | 5/2001 | Wu |
| 6,240,409 B1 | 5/2001 | Aiken |
| 6,353,825 B1 | 3/2002 | Ponte |
| 6,356,899 B1 | 3/2002 | Chakrabarti et al. |
| 6,366,906 B1 | 4/2002 | Hoffman |
| 6,460,029 B1 | 10/2002 | Fries et al. |
| 6,463,426 B1 | 10/2002 | Lipson et al. |
| 6,484,162 B1 | 11/2002 | Edlund et al. |
| 6,516,312 B1 | 2/2003 | Kraft et al. |
| 6,532,307 B1 | 3/2003 | Sato |
| 6,701,309 B1 | 3/2004 | Beeferman et al. |
| 6,701,310 B1 | 3/2004 | Sugiura et al. |
| 6,760,724 B1 | 7/2004 | Chakrabarti et al. |
| 7,200,584 B2 | 4/2007 | Sakurai |
| 7,292,634 B2 | 11/2007 | Yamamoto et al. |
| 7,296,011 B2 | 11/2007 | Chaudhuri et al. |

(Continued)

OTHER PUBLICATIONS

Silla, Jr., Carlos, N., et al., "An Analysis of Sentence Boundary Detection Systems for English and Portuguese Documents," Proceedings of 5th International Conference CICLing 2004, Seoul, Korea, Feb. 15-21, 2004, pp. 135-141.

(Continued)

*Primary Examiner* — Ajith Jacob
(74) *Attorney, Agent, or Firm* — Fish & Richardson P.C.

(57) ABSTRACT

Methods, systems, and apparatus, including computer program products, for suggesting alternative query phrases based on query search results. In one aspect, a method includes receiving a search result for a query, the search result comprising a link to a resource, the resource including text, analyzing the text of the resource to identify a suggested query phrase in the text of the resource using a computed similarity measure, the similarity measure being a measure of similarity between the query and the suggested query phrase, the suggested query phrase being a phrase in the resource determined to be similar to the query and not identical to the query, and providing the search result, the suggested query phrase, and a user interface object for presentation to a user, the suggested query phrase and the user interface object provided in context in a section of contiguous text from the resource.

30 Claims, 6 Drawing Sheets

(56) References Cited

U.S. PATENT DOCUMENTS

| | | | |
|---|---|---|---|
| 7,296,014 B1 | 11/2007 | Gilbert et al. | |
| 7,356,171 B2 | 4/2008 | Werthiem et al. | |
| 7,571,162 B2 | 8/2009 | Sun et al. | |
| 7,580,813 B2 | 8/2009 | Thiesson et al. | |
| 7,698,331 B2 | 4/2010 | Carson et al. | |
| 7,752,557 B2 | 7/2010 | Hoeber et al. | |
| 7,756,855 B2 | 7/2010 | Ismalon | |
| 7,792,769 B2 | 9/2010 | Kant et al. | |
| 7,840,579 B2 | 11/2010 | Samuelson et al. | |
| 7,885,911 B2 | 2/2011 | Cormode et al. | |
| 7,912,823 B2 | 3/2011 | Ferrari et al. | |
| 7,962,504 B1 | 6/2011 | Mehanna | |
| 8,005,813 B2 | 8/2011 | Chowdhury et al. | |
| 8,019,742 B1 | 9/2011 | Baluja et al. | |
| 8,024,337 B1 | 9/2011 | Baluja et al. | |
| 8,386,454 B2 | 2/2013 | Haas et al. | |
| 8,515,935 B1 | 8/2013 | Baluja et al. | |
| 2001/0047355 A1* | 11/2001 | Anwar | 707/5 |
| 2002/0019763 A1 | 2/2002 | Linden et al. | |
| 2002/0194166 A1 | 12/2002 | Fowler | |
| 2003/0033288 A1 | 2/2003 | Shanahan et al. | |
| 2003/0088554 A1 | 5/2003 | Ryan et al. | |
| 2003/0110163 A1 | 6/2003 | Chen et al. | |
| 2003/0172063 A1 | 9/2003 | Gutta et al. | |
| 2003/0212760 A1* | 11/2003 | Chen et al. | 709/218 |
| 2004/0254920 A1 | 12/2004 | Brill et al. | |
| 2005/0102259 A1 | 5/2005 | Kapur | |
| 2005/0161542 A1 | 7/2005 | Theut | |
| 2006/0010126 A1 | 1/2006 | Anick et al. | |
| 2006/0026152 A1 | 2/2006 | Zeng et al. | |
| 2006/0104484 A1 | 5/2006 | Bolle et al. | |
| 2006/0110043 A1 | 5/2006 | Reissman | |
| 2006/0112085 A1 | 5/2006 | Zijlstra et al. | |
| 2006/0161542 A1* | 7/2006 | Cucerzan et al. | 707/5 |
| 2006/0195443 A1 | 8/2006 | Franklin et al. | |
| 2006/0277210 A1* | 12/2006 | Starbuck | 707/102 |
| 2007/0050351 A1* | 3/2007 | Kasperski et al. | 707/4 |
| 2007/0162422 A1 | 7/2007 | Djabarov | |
| 2007/0239680 A1 | 10/2007 | Oztekin et al. | |
| 2007/0239713 A1 | 10/2007 | Leblang et al. | |
| 2007/0260635 A1 | 11/2007 | Ramer et al. | |
| 2007/0271255 A1 | 11/2007 | Pappo | |
| 2008/0027918 A1 | 1/2008 | Altevogt et al. | |
| 2008/0040325 A1 | 2/2008 | Sachs et al. | |
| 2008/0147638 A1 | 6/2008 | Hoeber et al. | |
| 2008/0288489 A1 | 11/2008 | Kim | |
| 2009/0144262 A1 | 6/2009 | White et al. | |
| 2009/0193352 A1 | 7/2009 | Bunn | |
| 2009/0248397 A1 | 10/2009 | Garcia et al. | |
| 2009/0249248 A1 | 10/2009 | Burckart et al. | |
| 2009/0287680 A1 | 11/2009 | Paek et al. | |
| 2010/0104158 A1 | 4/2010 | Shechtman et al. | |
| 2010/0106703 A1 | 4/2010 | Cramer | |
| 2010/0131484 A1 | 5/2010 | Gosse et al. | |
| 2010/0138400 A1 | 6/2010 | Curtis et al. | |
| 2010/0145678 A1 | 6/2010 | Csomai et al. | |
| 2010/0145940 A1 | 6/2010 | Chen et al. | |
| 2010/0169300 A1 | 7/2010 | Liu et al. | |
| 2010/0174710 A1 | 7/2010 | Carson et al. | |
| 2010/0205172 A1 | 8/2010 | Luk | |
| 2010/0287149 A1 | 11/2010 | Joshi | |
| 2010/0287175 A1 | 11/2010 | Beaudreau et al. | |
| 2011/0047136 A1 | 2/2011 | Dehn | |
| 2011/0252030 A1 | 10/2011 | Spangler | |
| 2012/0066216 A1 | 3/2012 | Alexander | |

OTHER PUBLICATIONS

Schneider, G., "A low-complexity, broad-coverage probabilistic Dependency Parser for English," Proceeding of HLT-NAACL 2003, Student Research Workshop, pp. 31-36, Edmonton, Canada, May-Jun. 2003.

Narrative Information Disclosure Statement (1 page) and screen shots showing highlighting a phrase from a first web page, "right clicking" to display a dialog box, and selecting a search option, which returns a second web page of search results for the highlighted phrase (2 pages). Jun. 27, 2008.

Chakrabarti et al., "Approximate query processing using wavelets," VLDB Journal: Very Large Data Bases, 2001, 10(2-3):199-223.

Chan et al., "Efficient time series matching by wavelets," ICDE, 1999, p. 126-133.

Chien et al., Semantic Similarity Between Search Engine Queries Using Temporal Correlation, May 10-14, 2005, ACM, www 2005; proceedings of the 14$^{th}$ international conference on world wide web, pp. 2-11.

Das et al., Google News Personalization: Scalable Online Collaborative Filtering, May 8-12; 2007, ACM—www 07—Proceedings of the 16$^{th}$ international conference on world wide web, pp. 271-280.

Garofalakis et al., "Wavelet synopses with error guarantee," Proceedings of 2002 ACM SIGMOD, Madison, Wisconsin, USA, Jun. 2002, ACM Press, pp. 476-487.

Gilbert et al., "Surfing wavelets on streams: One-pass summaries for approximate aggregate queries," The VLDB Journal, 2001, p. 79-88.

Jacobs et al., "Fast multiresolution image querying," Computer Graphics, 29(Annual Conference Series):277-286, 1995.

Li et al, A Survey on Wavelet Applications in Data Mining, Dec. 2002, ACM SIGKDD Explorations NewsLetter, vol. 4, Issue 2, pp. 49-68.

Matias et al., "Dynamic maintenance of wavelet-based histograms," VLDB '00, Morgan Kaufmann, 2000, 101-110.

Matias et al., "Wavelet-based histograms for selectivity estimation," ACM SIGMOD, 1998, p. 448-459, ACM Press.

Roerdink et al., "Wavelet-based Volume Visualization," Nieuw Archief voor Wiskunde, 1999, 17(2):149-158.

Shahabi et al., "2d TSAtree: A wavelet-based approach to improve the efficiency of multi-level spatial data mining," Statistical and Scientific Database Management, 2001, p. 59-68.

Shahabi et al., "TSA-tree: A Wavelet-based approach to improve the efficiency of multi-level surprise and trend queries on time-series data," Statistical and Scientific Database Management, 2000, p. 55-68.

Vitter et al., "Approximate computation of multidimensional aggregates of sparse data using wavelets," SIGMOD, 1999, p. 193-204.

Vitter et al., "Data cube approximation and histograms via wavelets," Proc. of the 7th Intl. Conf. on Information and Knowledge Management, 1998, 96-104.

Vlachos et al., "Identification of similarities, periodicities and bursts for online sesarch queries," In Int. Conf. Mgmt. Data (SIGMOD), 2004, 12 pages.

Wu et al., "A comparison of DFT and DWT based similarity search time-series databases," CIKM, 2000, p. 488-495.

Zhai et al., "A study on web-log using wavelet," Research and Development Information Retrieval, 2001, 1-34.

Office Action issued in U.S. Appl. No. 12/710,012 on Apr. 5, 2013, 23 pages.

Office Action Issued in U.S. Appl. No. 13/615,793 on Apr. 26, 2013, 22 pages.

Notice of Allowance received in U.S. Appl. No. 13/219,076 on May 15, 2013, 14 pages.

Office Action Issued in U.S. Appl. No. 11/756,127 on Sep. 16, 2009, 29 pages.

Office Action Issued in U.S. Appl. No. 11/756,127 on Jun. 9, 2010, 48 pages.

Notice of Allowance Issued in U.S. Appl. No. 11/756,127 on Jan. 6, 2011, 13 pages.

Notice of Allowance Issued in U.S. Appl. No. 11/756,127 on May 6, 2011, 9 pages.

"Low-Support, High Correlation, Finding Rare but Similar Items Minhashing Locality-Sensitive Hashing, 43 pages."

Jacobs, Charles E. et al., "Fast Multiresolution Image Querying," Department of Computer Science and Engineering, University of Washington, 10 pages.

Stollnitz et al., "Wavelets for Computer Graphics: A Primer, Part 1," IEEE Computer Graphics and Applications, 15(3): 76-84, May 1995, pp. 1-8.

(56) References Cited

OTHER PUBLICATIONS

Stollnitz et al., "Wavelets for Computer Graphics: A Primer, Part 2," IEEE Computer Graphics and Applications, 15(4): 75-85, Jul. 1995, pp. 1-9.
Office Action issued in U.S. Appl. No. 12/688,006 in Jul. 26, 2012, 22 pages.
Office Action Issued in U.S. Appl. No. 12/688,006 on Mar. 1, 2013, 29 pages.
Office Action issued in U.S. Appl. No. 12/710,012 on Feb. 16, 2012, 16 pages.
Office Action issued in U.S. Appl. No. 12/710,012 on Jul. 2, 2012, 14 pages.
Office Action issued in U.S. Appl. No. 13/219,076 on Jun. 28, 2012, 57 pages.
Office Action issued in U.S. Appl. No. 13/219,076 on Nov. 10, 2011, 45 pages.
Office Action issued in U.S. Appl. No. 12/710,012 on Apr. 23, 2014, 23 pages.
Office Action issued in U.S. Appl. No. 13/615,763 on Jun. 9, 2014, 22 pages.
Office Action issued in U.S. Appl. No. 13/615,045 on Aug. 13, 2014, 40 pages.
Notice of Allowance issued in U.S. Appl. No. 12/688,006 on May 23, 2014, 21 pages.
Office Action issued in U.S. Appl. No. 12/710,012 on Oct. 6, 2014, 30 pages.
Office Action issued in U.S. Appl. No. 13/615,763 on Oct. 6, 2014, 20 pages.
Office Action issued in U.S. Appl. No. 13/615,045 on Feb. 20, 2015, 15 pages.
Office Action Issued in U.S. Appl. No. 13/616,893 on Oct. 3, 2013, 32 pages.
Office Action issued in U.S. Appl. No. 12/710,012 on Apr. 5, 2013, 27 pages.
Office Action Issued in U.S. Appl. No. 12/710,012 on Oct. 2, 2013, 27 pages.
Office Action Issued in U.S. Appl. No. 13/615,793 on Nov. 8, 2013, 18 pages.
Notice of Allowance issued in U.S. Appl. No. 13/616,893 on Jan. 8, 2014, 10 pages.

\* cited by examiner

SUGGESTING ALTERNATIVE QUERY PHRASES IN QUERY RESULTS

BACKGROUND

This specification relates to suggesting alternative query phrases to users submitting queries to search engines.

Search engines—and, in particular, Internet search engines—aim to identify resources (e.g., web pages, images, text documents, multimedia context) that are relevant to a user's needs and to present information about the resources in a manner that is most useful to the user. Internet search engines return search results in response to a user submitted query. Unfortunately, the terms of a user submitted query may not align well with what the user has in mind, for example, if there is ambiguity in the meaning of the query terms. Even if the search results returned are relevant objectively to the user submitted query, the results may not be relevant to the user's actual subjective needs. If a user is dissatisfied with the search results returned for a query, the user can attempt to refine the query to better match the user's needs.

Some search engines provide to a user suggested alternative queries that the search engine identifies as being related to the user's query. Often, these suggested alternative queries are presented in proximity to the query search results, e.g., at the bottom of a web page of search results. However, due to limited availability of space on search results web pages, the number of suggested alternative queries which can be displayed may be limited. Moreover, the relationship between the query and the suggested alternative queries may not be apparent to a user, which may discourage the user from selecting any of the suggested alternative queries.

SUMMARY

This specification describes technologies relating to suggesting alternative query phrases based on query search results.

In general, one aspect of the subject matter described in this specification can be embodied in methods that include the actions of receiving a search result for a query, the search result comprising a link to a resource, the resource including text, analyzing the text of the resource to identify a suggested query phrase in the text of the resource using a computed similarity measure, the similarity measure being a measure of similarity between the query and the suggested query phrase, the suggested query phrase being a phrase in the resource determined to be similar to the query and not identical to the query, and providing the search result, the suggested query phrase, and a user interface object for presentation to a user, the suggested query phrase and the user interface object provided in context in a section of contiguous text from the resource, the user interface object being a user interface element the user can select to invoke the suggested query phrase as a new query. Other embodiments of this aspect include corresponding systems, apparatus, and computer program products.

These and other embodiments can optionally include one or more of the following features. The search result can include the section of contiguous text from the resource, analyzing the text of the resource to identify the suggested query phrase in the text of the resource can further include analyzing the section of contiguous text from the resource to identify the suggested query phrase in the section of contiguous text from the resource, and providing the search result, the suggested query phrase, and the user interface object can further include providing the section of contiguous text with the suggested query phrase emphasized to distinguish the suggested query phrase from the rest of the section of contiguous text. The search result including the section of contiguous text can be caused to be transmitted to a client device for presentation to a user.

It can be determined that the query satisfies one or more conditions that indicate that identifying a suggested query phrase would be beneficial before analyzing the text of the resource to identify the suggested query phrase. Determining that the query satisfies one or more conditions can include determining that the query has a natural language structure. Determining that the query satisfies one or more conditions can include determining that the query has a number of words that exceeds a predetermined value.

Analyzing the text of the resource to identify the suggested query phrase in the text of the resource can further include identifying a plurality of clauses in the text of the resource, calculating a similarity measure for each clause in the plurality of clauses, the similarity measure for a clause being a measure of the similarity between the clause and the query, and identifying a clause in the plurality of clauses that has a highest similarity measure as the suggested query phrase. Analyzing the text of the resource to identify the suggested query phrase in the text of the resource can further include identifying a plurality of sentences in the text of the resource, calculating a similarity measure for each sentence in the plurality of sentences, the similarity measure for a sentence being a measure of the similarity between the sentence and the query, and identifying a sentence in the plurality of sentences that has a highest similarity measure as the suggested query phrase.

Contiguous text from the resource that includes the suggested query phrase can be identified as the section of contiguous text, and the section of contiguous text can be provided with the suggested query phrase emphasized to distinguish the suggested query phrase from the rest of the section of contiguous text. The user interface object can be one of a hyperlink, a button, or a check box. The resource can be a Portable Document Format (PDF) document, a HyperText Markup Language (HTML) document, an Extensible Markup Language (XML) document, a word processing document, or a plain text document.

In general, in one aspect, a method is provided. The method includes receiving a query, receiving multiple search results for the query, each search result comprising a link to a respective resource, each respective resource including text, processing each search result of the multiple search results by: identifying a plurality of clauses in the text of the respective resource, calculating a similarity measure for each clause in the plurality of clauses, the similarity measure for a clause being a measure of the similarity between the clause and the query, identifying as a suggested query phrase a clause in the plurality of clauses that has a highest similarity measure, the suggested query phrase being a clause in the respective resource that is not identical to the query, determining if the similarity measure for the clause identified as the suggested query phrase exceeds a predetermined threshold, and identifying a section of contiguous text from the respective resource, wherein the section of contiguous text includes the suggested query phrase if the similarity measure for the clause identified as the suggested query phrase exceeds the predetermined threshold, and providing the multiple search results for presentation to a user, each search result including the respective section of contiguous text, where each suggested query phrase included in the respective section of contiguous text is provided in context in the respective section of contiguous text, the suggested query phrase associated with a user interface object, the user interface object being a user interface element the user can select to invoke the suggested query phrase as a new query. Other embodiments of this aspect include corresponding systems, apparatus, and computer program products.

These and other embodiments can optionally include one or more of the following features. It can be determined that the query satisfies one or more conditions that indicate that identifying a suggested query phrase would be beneficial before processing each search result of the multiple search results. Determining that the query satisfies one or more conditions can further include determining that the query has a natural language structure. Determining that the query satisfies one or more conditions can further include determining that the query has a number of words that exceeds a determined value. Identifying the plurality of clauses in the text of the respective resource can further include identifying one or more of capitalization, abbreviation, or lexical features in the respective resource. Calculating the similarity measure for a clause in the plurality of clauses can further include calculating the similarity measure using a function that weights a word in the query that is missing from the clause differently from a word in the clause that is missing from the query. The multiple search results can be provided for presentation in an order determined using the similarity measures for the clauses identified as the suggested query phrases.

In general, in one aspect, a method is provided. The method includes receiving a search result for a query, the search result comprising a link to a resource, the resource including text, analyzing the text of the resource to identify a suggested query phrase in the text of the resource using a computed histogram of words in the text of the resource, the suggested query phrase being a phrase in the resource characteristic of the resource and not identical to the query, and providing the search result, the suggested query phrase, and a user interface object for presentation to a user, the suggested query phrase and the user interface object provided in context in a section of contiguous text from the resource, the user interface object being a user interface element the user can select to invoke the suggested query phrase as a new query. Other embodiments of this aspect include corresponding systems, apparatus, and computer program products.

These and other embodiments can optionally include one or more of the following features. Analyzing the text of the resource to identify a suggested query phrase in the text of the resource can further include computing the histogram of words in the text of the resource, and identifying a clause in the text of the resource that includes words with high frequency based on the histogram as the suggested query phrase. It can be determined that the query satisfies one or more conditions that indicate that identifying a suggested query phrase would be beneficial before analyzing the text of the resource to identify the suggested query phrase.

In general, in one aspect, a system is provided. The system includes a user interface device, and one or more computers operable to interact with the user interface device and to: receive a search result for a query, the search result comprising a link to a resource, the resource including text, analyze the text of the resource to identify a suggested query phrase in the text of the resource using a computed similarity measure, the similarity measure being a measure of similarity between the query and the suggested query phrase, the suggested query phrase being a phrase in the resource determined to be similar to the query and not identical to the query, and provide the search result, the suggested query phrase, and a user interface object for presentation to a user of the user interface device, the suggested query phrase and the user interface object provided in context in a section of contiguous text from the resource, the user interface object being a user interface element the user can select to invoke the suggested query phrase as a new query. Other embodiments of this aspect include corresponding methods, apparatus, and computer program products.

These and other embodiments can optionally include one or more of the following features. The one or more computers can include a server operable to interact with the user interface device through a data communication network, and the user interface device can be operable to interact with the server as a client. The user interface device can include a personal computer running a web browser, a mobile telephone running a HyperText Transfer Protocol (HTTP) or a Wireless Application Protocol (WAP) browser, or a device with spoken language input. The one or more computers can include one personal computer, and the personal computer can include the user interface device.

In general, in one aspect, a system is provided. The system includes a user interface device, and one or more computers operable to interact with the user interface device and to: receive a query, receive multiple search results for the query, each search result comprising a link to a respective resource, each respective resource including text, process each search result of the multiple search results by: identifying a plurality of clauses in the text of the respective resource, calculating a similarity measure for each clause in the plurality of clauses, the similarity measure for a clause being a measure of the similarity between the clause and the query, identifying as a suggested query phrase a clause in the plurality of clauses that has a highest similarity measure, the suggested query phrase being a clause in the respective resource that is not identical to the query, determining if the similarity measure for the clause identified as the suggested query phrase exceeds a predetermined threshold, and identifying a section of contiguous text from the respective resource, wherein the section of contiguous text includes the suggested query phrase if the similarity measure for the clause identified as the suggested query phrase exceeds the predetermined threshold, and provide the multiple search results for presentation to a user of the user interface device, each search result including the respective section of contiguous text, where each suggested query phrase included in the respective section of contiguous text is provided in context in the respective section of contiguous text, the suggested query phrase associated with a user interface object, the user interface object being a user interface element the user can select to invoke the suggested query phrase as a new query. Other embodiments of this aspect include corresponding methods, apparatus, and computer program products.

These and other embodiments can optionally include one or more of the following features. The one or more computers can include a server operable to interact with the user interface device through a data communication network, and the user interface device can be operable to interact with the server as a client. The user interface device can include a personal computer running a web browser, a mobile telephone running an HTTP or a WAP browser, or a device with spoken language input. The one or more computers can include one personal computer, and the personal computer can include the user interface device.

In general, in one aspect, a system is provided. The system includes a user interface device, and one or more computers operable to interact with the user interface device and to: receive a search result for a query, the search result comprising a link to a resource, the resource including text, analyze the text of the resource to identify a suggested query phrase in the text of the resource using a computed histogram of words in the text of the resource, the suggested query phrase being a phrase in the resource characteristic of the resource and not identical to the query, and provide the search result, the suggested query phrase, and a user interface object for presentation to a user of the user interface device, the suggested query phrase and the user interface object provided in context in a section of contiguous text from the resource, the user interface object being a user interface element the user can select to invoke the suggested query phrase as a new query. Other embodiments of this aspect include corresponding methods, apparatus, and computer program products.

Particular embodiments of the subject matter described in this specification can be implemented to realize one or more of the following advantages. A large number of suggested alternative query phrases can be displayed with query search results by including the suggested alternative query phrases in snippets of content presented to a user as part of the query search results. The relationship between the query and each suggested alternative query phrase is easy to understand when the suggested alternative query phrases are part of snippets. Suggested alternative query phrases can be especially useful for users who wish to submit complex natural language queries or queries in situations where typing is awkward, for example, when a user submits queries on devices without a full-sized keyboard (e.g., mobile phones). Suggested alternative query phrases can also be useful for browsing in a non-Roman-based script, e.g., in Chinese, because submitting a query in a non-Roman-based script can take longer than entering the same query in a Roman-based script. The technique provides users with an additional way to browse text repositories. Thus, in addition to explicitly typing queries or selecting text hyperlinks provided by document authors, with the described technique, any sentence in the text repository relevant to an initial query can be provided as an implicit hyperlink for locating further textual content of interest to the user.

The details of one or more embodiments of the subject matter described in this specification are set forth in the accompanying drawings and the description below. Other features, objects, and advantages of the subject matter will be apparent from the description, the drawings, and the claims.

BRIEF DESCRIPTION OF DRAWINGS

Like reference symbols and designations in the various drawings indicate like elements.

DETAILED DESCRIPTION

Figure 1:
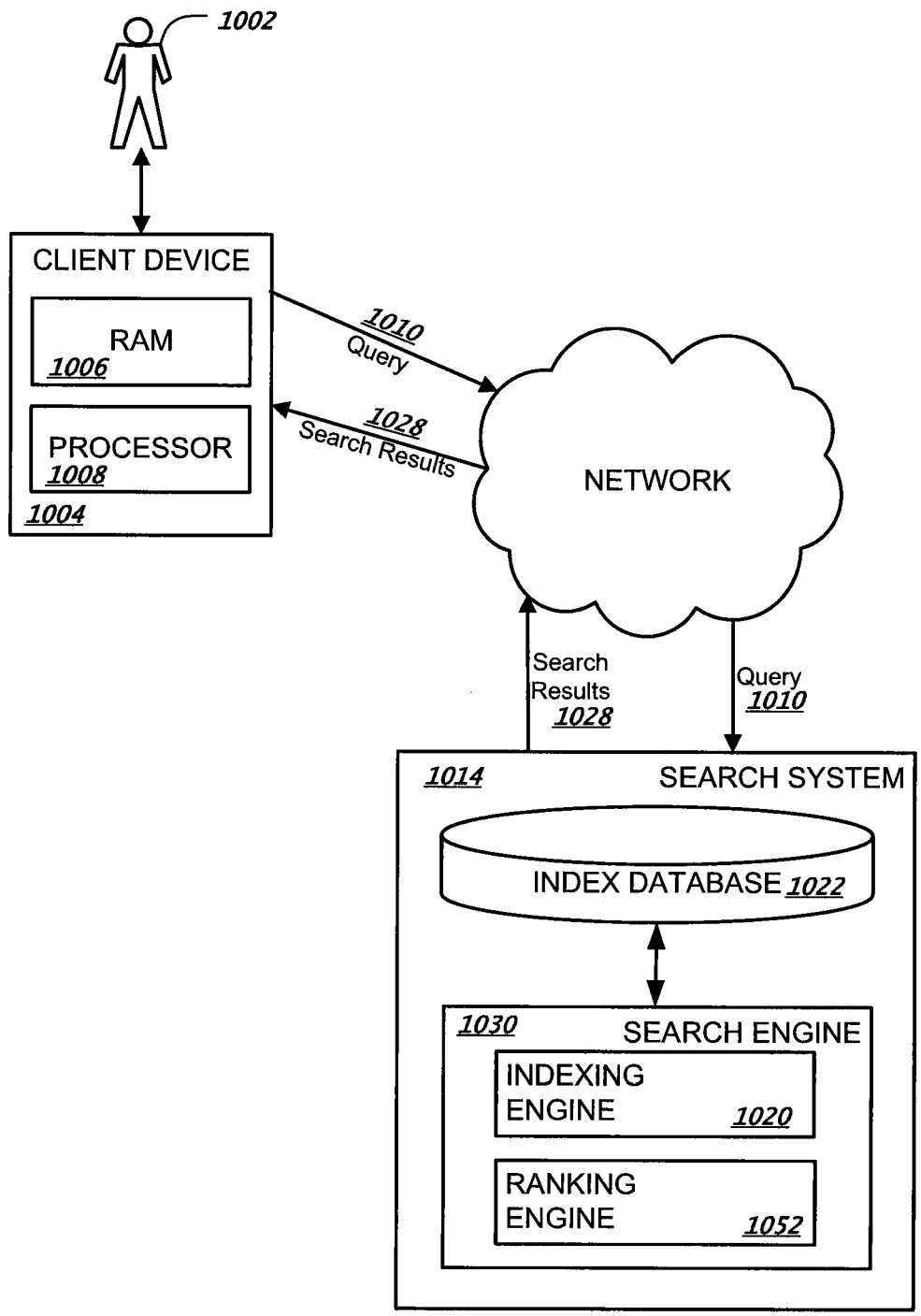
FIG. 1 is a block diagram of an example search system.

FIG. 1 is a block diagram of an example search system 1014 that can be used to provide search results relevant to submitted queries as can be implemented in an Internet, an intranet, or another client and server environment. The search system 1014 is an example of an information retrieval system in which the systems, components, and techniques described below can be implemented.

A user 1002 can interact with the search system 1014 through a client device 1004. For example, the client 1004 can be a computer coupled to the search system 1014 through a local area network (LAN) or wide area network (WAN), e.g., the Internet. In some implementations, the search system 1014 and the client device 1004 can be one machine. For example, a user can install a desktop search application on the client device 1004. The client device 1004 will generally include a random access memory (RAM) 1006 and a processor 1008.

A user 1002 can submit a query 1010 to a search engine 1030 within a search system 1014. When the user 1002 submits a query 1010, the query 1010 is transmitted through a network to the search system 1014. The search system 1014 can be implemented as, for example, computer programs running on one or more computers in one or more locations that are coupled to each other through a network. The search system 1014 includes an index database 1022 and a search engine 1030. The search system 1014 responds to the query 1010 by generating search results 1028, which are transmitted through the network to the client device 1004 in a form that can be presented to the user 1002 (e.g., as a search results web page to be displayed in a web browser running on the client device 1004).

When the query 1010 is received by the search engine 1030, the search engine 1030 identifies resources that match the query 1010. The search engine 1030 will generally include an indexing engine 1020 that indexes resources (e.g., web pages, images, or news articles on the Internet), an index database 1022 that stores the index information, and a ranking engine 1052 (or other software) that ranks the resources that match the query 1010. The search engine 1030 can transmit the search results 1028 through the network to the client device 1004 for presentation to the user 1002.

Figure 2:
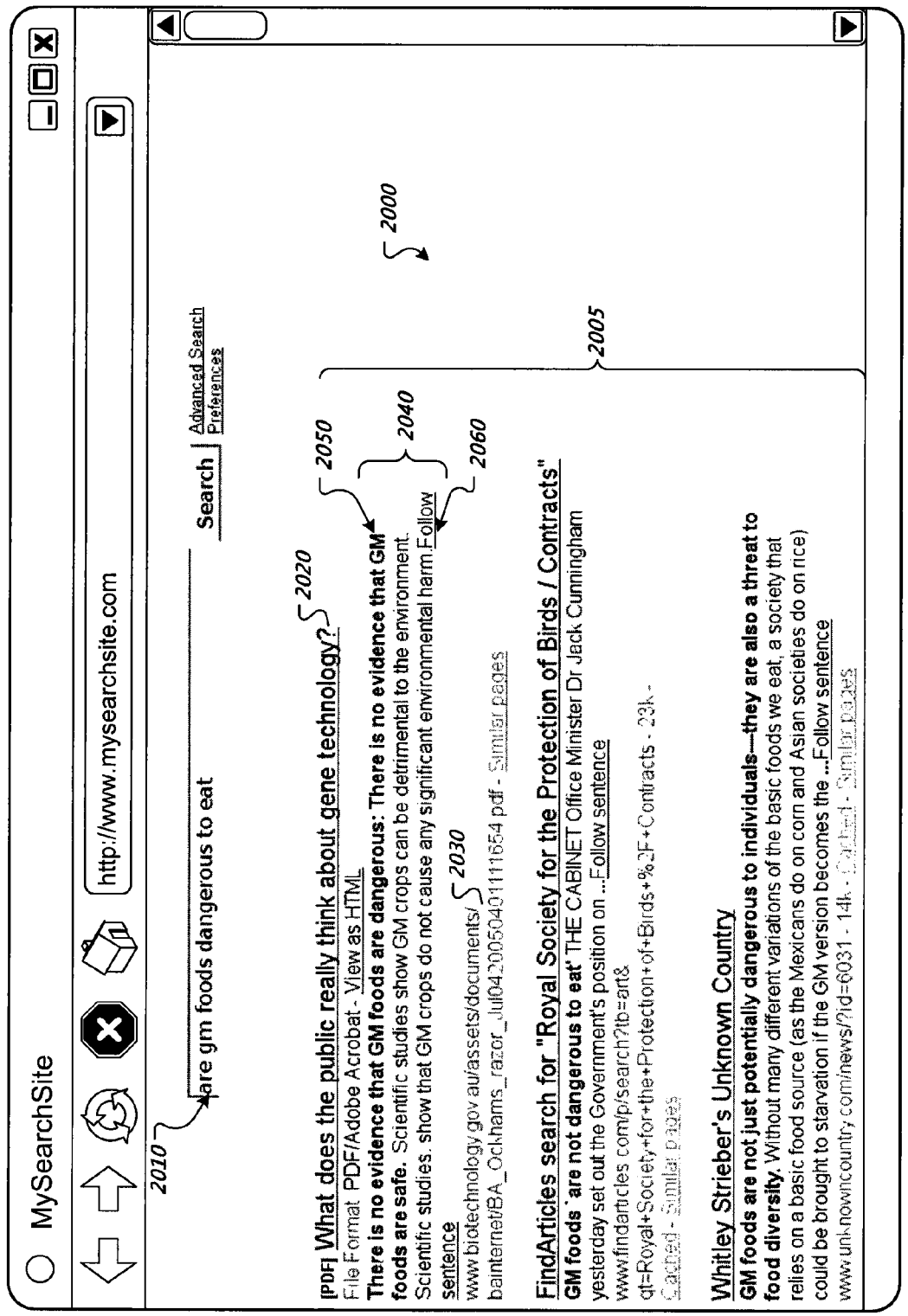
FIG. 2 illustrates an example web page of search results including suggested query phrases.

FIG. 2 illustrates an example web page 2000 of search results including suggested query phrases 2050. The web page 2000 includes a query 2010, "are gm foods dangerous to eat." The query 2010 can be a natural language query phrase. The term "natural language query phrase" is used in this specification to refer to any query that is expressed using conversational syntax. In other words, a natural language query phrase is phrased as if spoken or written to another individual. In contrast, a "Boolean query" is any query that is expressed with search terms connected with Boolean operators, possibly conforming to a specific search syntax (e.g., "America AND Revolution"). Internet search engines will generally respond to either type of query.

In response to the query 2010, the search engine 1030 returns a group of search results 2005. A search result can include, for each of a number of resources, a title 2020 for the resource, a selectable link 2030 to the resource, and a snippet 2040 of content from the resource. Generally, a snippet 2040 of content includes one or more words, phrases, clauses, or sentences extracted from the textual content of the resource. A phrase is a meaningful sequence of two or more words. A clause is a phrase that includes a subject (which may be implicit) and predicate but does not constitute a complete sentence. The search system 1014 extracts a contiguous segment of textual content from the resource to form a snippet 2040. In some implementations, the search system 1014 extracts segments of textual content from different portions of the resource to form the snippet 2040.

The search system 1014 can provide to the user one or more suggested alternative query phrases 2050 as alternatives for the query 2010. In typical search systems, the suggested alternative query phrases are presented in proximity to the query search results (e.g., at the bottom of a web page of search results). The search engine 1030 of the search system 1014 can transmit to a client device 1004 instructions for presenting the suggested alternative query phrases to the user. These instructions can be included with the search results 2005 that match the query 2010 and can be executed by the client device 1004. Particular techniques for identifying a suggested alternative query phrase in the textual content of a search result resource are described below.

For each suggested alternative query phrase, the search system 1014 provides the suggested alternative query phrase as a portion of the query phrase's respective snippet. In some implementations, a suggested alternative query phrase is emphasized to distinguish the suggested alternative query phrase from the rest of the respective snippet. For example, in snippet 2040, the suggested alternative query phrase, "There is no evidence that GM foods are dangerous: There is no evidence that GM foods are safe." 2050 is presented in bold font to distinguish the suggested alternative query phrase 2050 from the rest of the respective snippet 2040. In addition, for each suggested alternative query phrase, the search system 1014 can generate a respective user interface object (e.g., a user interface element that the user can select) that allows the user to invoke the respective suggested alternative query phrase. For example, the user interface element can be a hyperlink, a button, or a check box. If a user selects the hyperlink (e.g., the Uniform Resource Locator (URL) link 2060), the web browser submits the suggested alternative query phrase 2050, in response to which the search engine 1030 generates new search results for the suggested alternative query phrase 2050.

Figure 3:
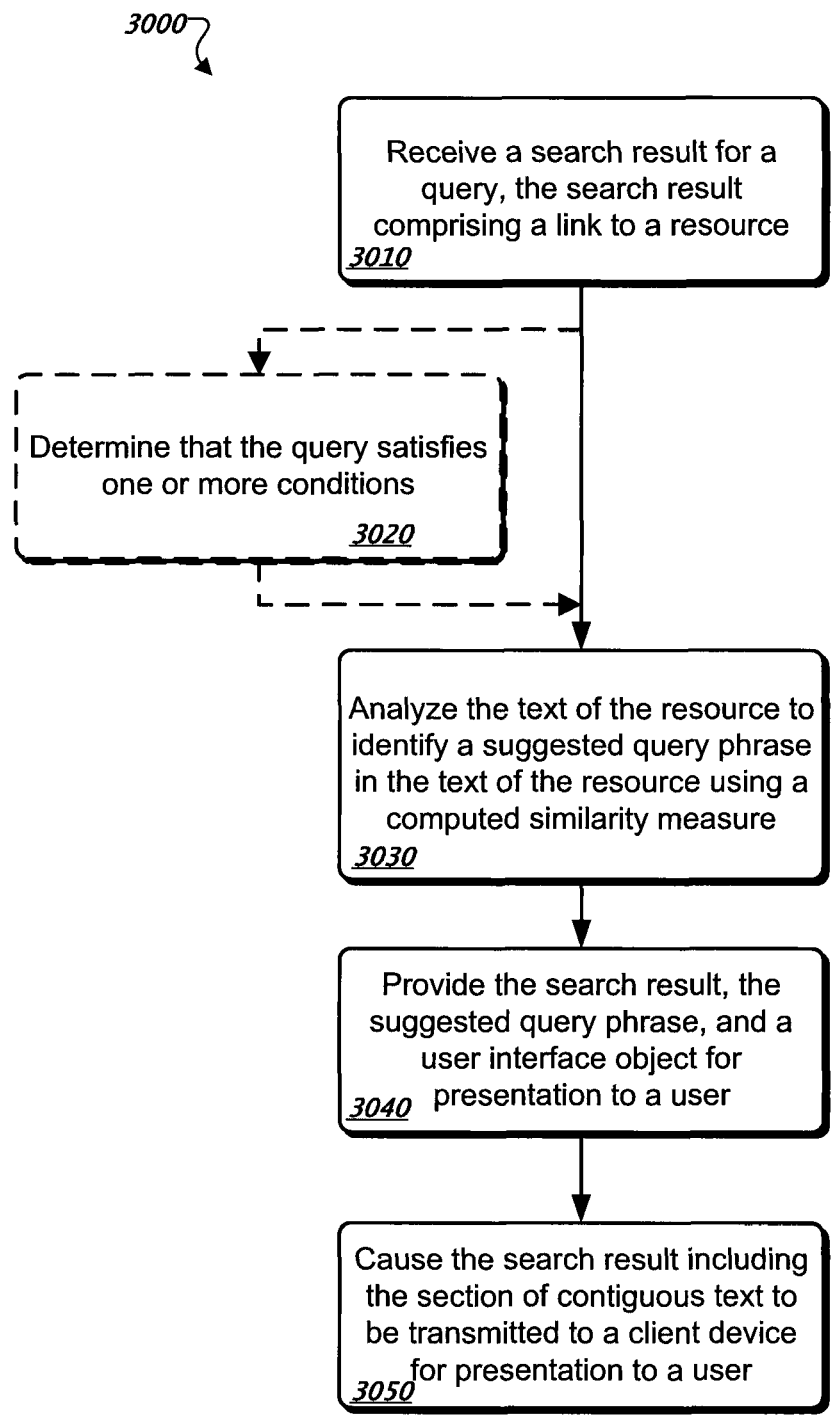
FIG. 3 is a flow chart of an example process for providing one or more suggested query phrases.

FIG. 3 is a flow chart of an example process 3000 for providing one or more suggested query phrases. For convenience, the example process 3000 will be described with reference to FIG. 2 and a system that performs the process 3000. In general, the system performs the process 3000 in response to receiving a query submitted by a user. For example, in reference to FIG. 2, the system performs the process 3000 after the user submits the query 2010 and requests that the search system 1014 conduct a search (e.g., when the user clicks a user interface "search" button or provides other user inputs in a search application).

The system receives a search result for a query, where the search result includes a link (e.g., a URL link or a hyperlink to a local file system location) to a resource (step 3010). In general, the resource may be any electronic document that contains text (e.g., a PDF document, an HTML document, an XML document, a word processing document, or a plain text document).

The received search result may be found in a variety of ways using any number of conventional techniques. For example, the search engine 1030 can use inverted-index posting lists for keywords in the query 2010 to find suitable search results. As another example, stop words (e.g., "a," "the," and "and") may be identified and removed from the query when finding suitable results. In some implementations, the received search result is one of multiple received search results sorted using a ranking function, and the search results with the highest-ranking scores are selected for display. In the example of FIG. 2, the search results 2005 are received corresponding to one or more resources (e.g., web pages) that contain information relevant to the query 2010. In some implementations, the system sorts the search results based on the ranking function and a similarity function. For example, a weighted sum of the ranking function and a similarity function can be used to sort the received search results. Similarity functions are described in more detail below. In some implementations, synonyms for the keywords in the query 2010 are also identified when finding suitable search results.

In some implementations, the system determines that the query satisfies one or more conditions (step 3020). The one or more conditions indicate that the search for results matching the query is likely to benefit from identifying suggested query phrases. In some implementations, the system identifies the number of words in the query to determine if the number of words exceeds a predetermined value. In other implementations, the query is submitted to a natural language parser to determine if the query has a natural language structure. In some implementations, the system does not perform step 3020. For example, if a user enters the query in a search system designed to treat all queries as natural language queries, the search system can bypass step 3020.

The system analyzes the text of the resource to identify a suggested query phrase in the text of the resource using a computed similarity measure (step 3030). If step 3020 is performed, the system analyzes the text after determining that the query satisfies one or more conditions. The similarity measure is a measure of the similarity between the query and the suggested query phrase. The suggested query phrase is a phrase identified in the resource that is determined to be similar, but not identical, to the query. Particular techniques for computing a similarity measure for identifying a suggested query phrase are described in more detail below.

In some implementations, the system identifies a suggested query phrase using a computed histogram of words in the text of the resource. For example, after the system computes the histogram of the words in the textual content of the resource, the system identifies a clause or sentence in the textual content of the resource that includes words with high frequencies according to the histogram as the suggested query phrase. In these implementations, the identified suggested query phrase is a phrase in the resource that is characteristic of the resource.

The system provides the search result, the suggested query phrase, and a user interface object for presentation to a user (step 3040). The suggested query phrase and the user interface object are provided in context in a section of contiguous text from the resource (e.g., a snippet of content from the resource). The user interface object can be any user interface element (e.g., a hyperlink, a button, or a check box) that the user can select to invoke (i.e., submit to the search engine) the suggested query phrase as a new query. For example, the server system 1014 can provide the search results 2005 as HTML code or in other conventional representations that describe the web page 2000, including the URL link 2060, which allows a user to invoke the suggested query phrase 2050 as a new query.

The system causes the search result including the section of contiguous text to be transmitted to a client device 1004 for presentation to a user (step 3050). For example, the server system 1014 can transmit HTML code as search results 1028 over a network using any of a number of conventional transmission protocols. The client device 1004 can receive the HTML code that, when rendered by a web browser running on the client device 1004, presents the search results 1028 including one or more suggested query phrases to a user.

Figure 4:
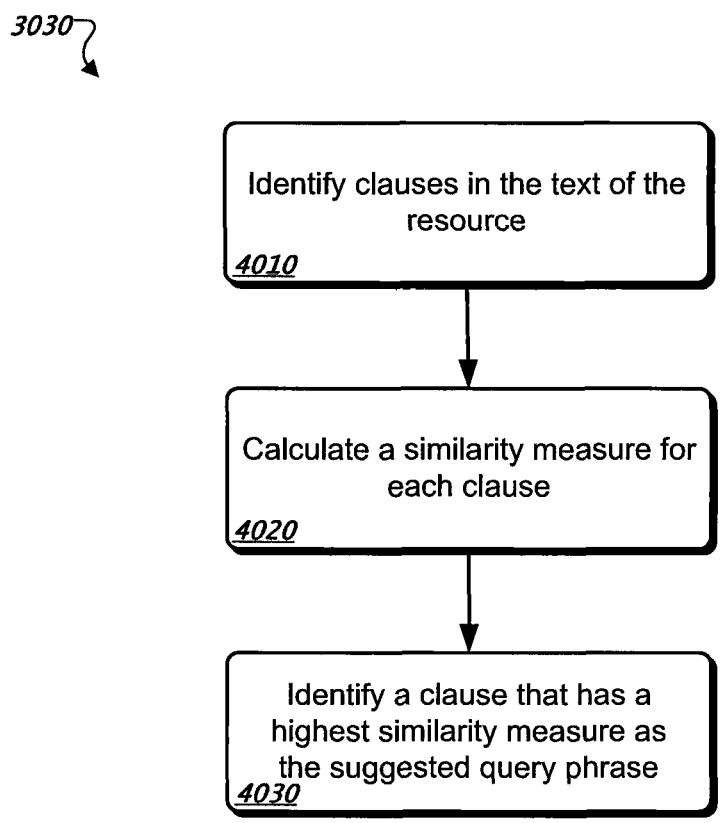
FIG. 4 is a flow chart of an example process for analyzing text of a resource to identify a suggested query phrase in the text of the resource.

FIG. 4 is a flow chart of an example process 3030 for analyzing text of a resource to identify a suggested query phrase in the text of the resource. For convenience, the example process 3030 will be described with reference to FIG. 2 and a system that performs the process 3030. In general, the system performs the process 3030 in response to receiving one or more search results referring to one or more resources.

The system identifies multiple clauses in the text of the resource (step 4010). In some implementations, instead of clauses, the system identifies multiple sentences in the text of the resource. The sentences can be identified in the text of the resource using any number of conventional techniques. For example, the textual content of the resource can be evaluated to identify end-of-sentence punctuation marks. In some implementations, for certain languages (e.g., English), the system identifies capitalization, abbreviation, lexical features, or punctuation to identify clausal or sentence boundaries. Systems for performing automatic text segmentation are described, for example, in Carlos N. Silla Jr. and Celso A. A. Kaestner, "An Analysis of Sentence Boundary Detection Systems for English and Portuguese Documents," Computational Linguistics and Intelligent Text Processing, Springer Berlin, pages 135-141, 2004.

The system calculates a similarity measure for each identified clause, where the similarity measure is a measure of the similarity between the identified clause and the query (step 4020). In some implementations, the system calculates the similarity measure using a function that takes into account word synonyms. In the example of FIG. 2, the term "dangerous" in the query 2010 can be replaced with "hazardous," "unsafe," or any other appropriate synonym when calculating the similarity measure.

In some implementations, the similarity measure is calculated using a function that evaluates the occurrence of multi-word sequences, i.e., n-gram sequences of n consecutive words. An n-gram has an order, which is the number of words in the n-gram. For example, a 1-gram (or unigram) includes one word; a 2-gram (or bigram) includes two words. One example of a similarity measure is the Bilingual Evaluation Understudy (BLEU) score. BLEU is a method generally used for evaluating the quality of text which has been translated from one natural language to another using machine translation. When the BLEU score is used as the similarity measure between a query and a clause identified in a resource, the BLEU score provides a measure of how close, statistically, the identified clause is to the query.

In some implementations, the similarity measure is calculated using a function that evaluates the linguistic relations between words. Linguistic relation features for a segment of text, for example, a query or a clause identified in a resource, can be identified by applying a natural language parser (e.g., a dependency parser) to the text. The parser can identify linguistic relations (e.g., the relation between a verb and the main noun of the subject) as well as relation paths (e.g., the relation path between a main verb and an adjective of the main noun of the object of a sentence). A dependency parser is described, for example, in Gerold Schneider, "A Low-Complexity, Broad-Coverage Probabilistic Dependency Parser for English," Proceedings of the 2003 Conference of the North American Chapter of the Association for Computational Linguistics on Human Language Technology, Edmonton, Canada, pages 31-36, May-June 2003. When linguistic relation features are used to calculate the similarity measure between a query and a clause identified in a resource, the similarity measure increases with an increase in the co-occurrence of the linguistic relation features in the query and in the clause.

A function used for calculating the similarity measure between the query and a clause can treat missing words symmetrically or asymmetrically. For example, a function can weight a word in the query that is missing from the clause the same as (i.e., symmetrically) or differently from (asymmetrically) a word in the clause that is missing from the query. In some implementations, additional words in the clause (i.e., words not present in the query) are penalized less than words in the query that are missing from the clause. In the example of FIG. 2, the suggested query phrase "GM foods are not just potentially dangerous to individuals—they are also a threat to food diversity" is one example of a clause that might have a high similarity score relative to the query 2010 "are gm foods dangerous to eat" despite the suggested query phrase having many words that are not present in the query 2010.

In some implementations, the similarity measure is calculated using a function that evaluates both the n-gram features and the linguistic relation features. Each type of feature (e.g., an n-gram of a particular length n or the type of relation between word pairs) is given a weight corresponding to a perceived or observed importance of that feature type to textual similarity. The features present in the query are placed in one group and the features present in the clause identified in the resource are place in another group. A symmetric similarity measure can be calculated by dividing the sum of weights of the features in the intersection of the two groups by the sum of weights of the features in the union of the two groups. Alternatively, an asymmetric similarity measure can be calculated by dividing the sum of weights of the features in the intersection by the sum of weights of the features in the union, where the union is further divided into three subgroups: the intersection and the two difference groups. The features of the difference group of features in the query missing from the identified clause are weighted more heavily than the features of the other difference group of features in the identified clause missing from the query.

After the system calculates measures of similarity between each of the identified clauses and the query, the system identifies a clause with a highest similarity measure as the suggested query phrase (step 4030). The system then identifies a section of contiguous text from the resource that includes the suggested query phrase. For example, the system can identify a text snippet from the resource that includes the suggested query phrase and optionally includes some additional surrounding text. If the optional surrounding text is included, the suggested query phrase is emphasized when presented to a user to help the user distinguish the suggested query phrase from the other text in the snippet. For example, when the system provides the suggested query phrase and the user interface object in context in the section of contiguous text (step 3040 of FIG. 3), the suggested query phrase can be differentiated in the section of contiguous text, e.g., by bolding, highlighting, underlining, or using different font type or color.

In some implementations, when the system receives the search result (step 3010 of FIG. 3), the received search result includes the section of contiguous text from the resource (e.g., as a snippet of content identified from the resource using conventional techniques). The system can identify a suggested query phrase in the section of contiguous text from the resource, e.g., by calculating similarity measures between the query and clauses identified in the section of contiguous text. Alternatively, the system can identify a suggested query phrase from analyzing all the text of the resource (as described above) and can append the identified suggested query phrase to the section of contiguous text included with the received search result.

In some implementations, the search results are provided for presentation to a user in an order that is determined using the similarity measures for the clauses identified as the suggested query phrases. The search engine's ranking function can be modified to give weight to the computed similarity measures. Alternatively, some (e.g., the highest 100) or all of the search results ranked using the search engine's general ranking function can be re-ranked using the computed similarity measures. For example, if the clause identified as the suggested query phrase for a particular search result has a high similarity measure, the ranking order of the particular search result can be adjusted (e.g., boosted) relative to the ranking order of other received search results.

Figure 5:
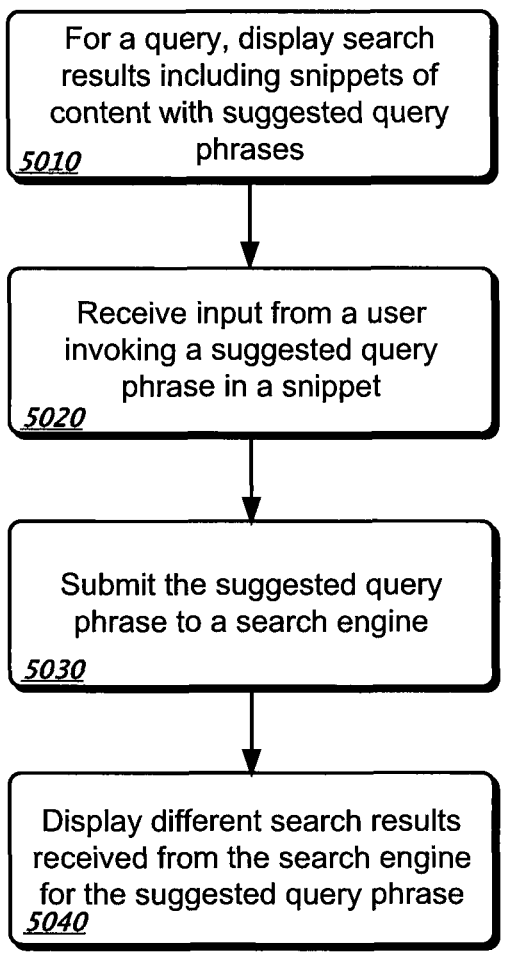
FIG. 5 is a flow chart of an example process for invoking a suggested query phrase.

FIG. 5 is a flow chart of an example process 5000 for invoking a suggested query phrase. For convenience, the example process 5000 will be described with reference to FIG. 2 and a client device 1004 that performs the process 5000.

For a query, the client device 1004 displays search results including snippets of content with suggested query phrases (step S010). The client device 1004 receives input from a user invoking a suggested query phrase in a snippet (step S020). In the example of FIG. 2, the user can select the URL link 2060 to invoke the suggested alternative query phrase 2050 in snippet 2040 as a new query.

In response to the user input, the client device 1004 submits to the search engine 1030 the suggested query phrase (step S030). The search engine 1030 processes the suggested query phrase as a new query. The system displays one or more different search results received from the search engine 1030 for the suggested query phrase (5040). The search engine 1030 returns the search results for the suggested query phrase as it would for any other query. That is, without explicitly entering a new query into a search text field of the web page 2000 or even highlighting the new query, a user can receive search results for the suggested alternative query phrase 2050 by simply selecting the corresponding URL link 2060 displayed on the web page 2000.

Figure 6:
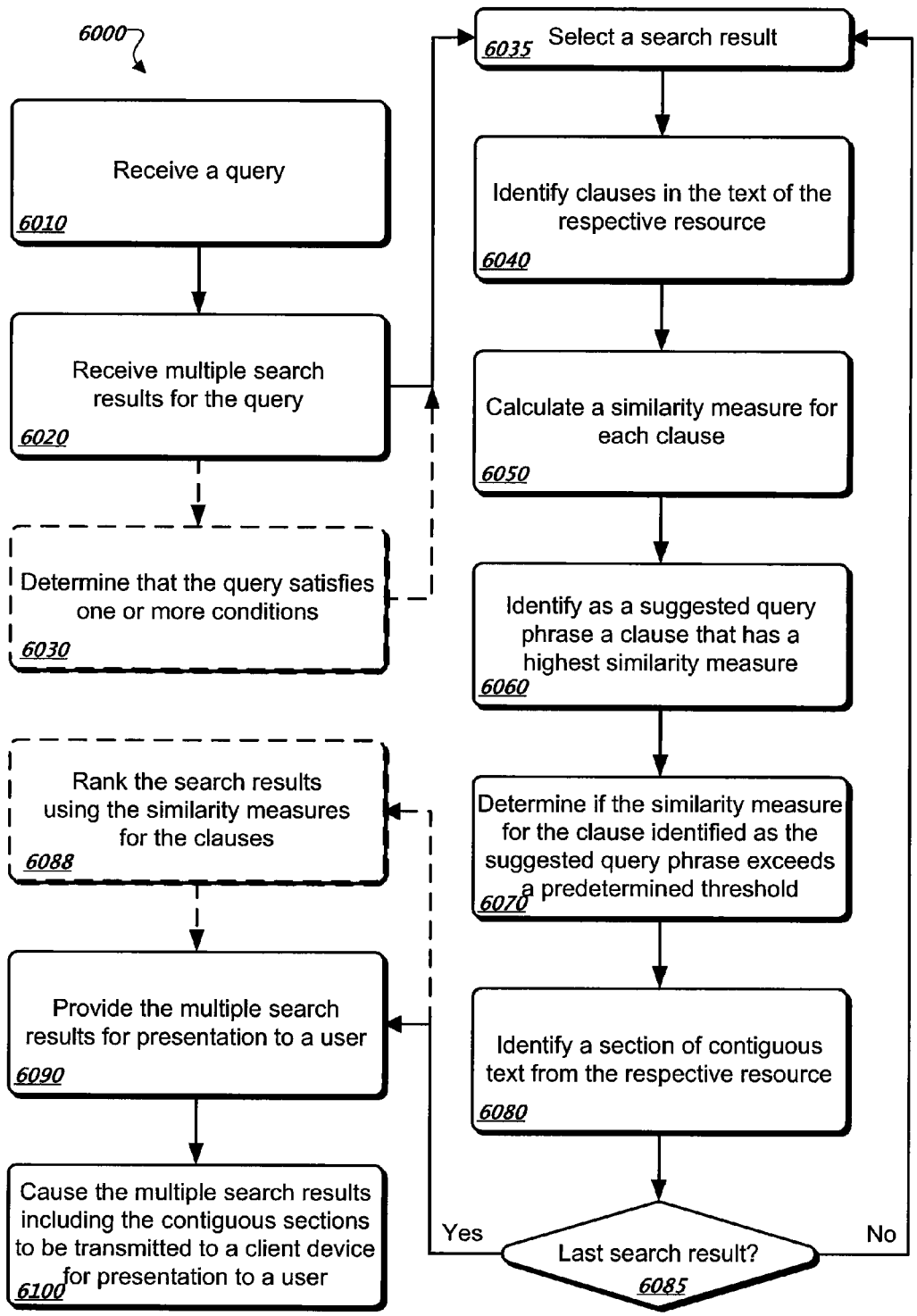
FIG. 6 is a flow chart of an example process for providing one or more suggested query phrases.

FIG. 6 is a flow chart of an example process 6000 for providing one or more suggested query phrases. For convenience, the process 6000 will be described with reference to FIG. 2 and a system that performs the process 6000.

The system receives a query (step 6010). For example, in reference to FIG. 2, the system can receive a query entered by a user into an input field of web page 2000. As another example, the system can receive a query in a URL link (e.g., URL link 2060) selected by the user.

The system receives multiple search results for the query, where each search result includes a link (e.g., a URL link) to a respective resource, which includes text (step 6020). In some implementations, the system determines that the query satisfies one or more conditions (step 6030). In some implementations, if the query does not satisfy the one or more conditions, the multiple search results are provided for presentation to a user without performing the remaining steps of process 6000.

A search result is selected for processing (step 6035). If step 6030 is performed, the system selects a search result after determining that the query satisfies the one or more conditions. The system identifies multiple clauses in the text of the respective resource (step 6040). A clause can be a portion of a sentence or an entire sentence. The system can identify multiple clauses in the text of the respective resource using conventional techniques.

For each identified clause, the system calculates a measure of similarity between the identified clause and the query (step 6050). The system identifies as a suggested query phrase a clause that has a highest similarity measure (step 6060). The suggested query phrase is also a phrase in the respective resource that is not identical to the query. In some implementations, the system identifies multiple suggested query phrases for a particular resource, for example, when multiple clauses have the same similarity measure.

The system determines if the similarity measure for the clause identified as the suggested query phrase exceeds a predetermined threshold (step 6070). The predetermined threshold is used to ensure the quality of a suggested query phrase as a suggestion based on the similarity between the suggested query phrase and the query. The system identifies a section of contiguous text from the respective resource (step 6080). If the system determines that the similarity measure exceeds the predetermined threshold, the section of contiguous text identified in step 6080 includes the suggested query phrase and optionally includes some additional surrounding text. In some implementations, if the system determines that the similarity measure does not exceed the predetermined threshold, the section of contiguous text identified in step 6080 does not include the suggested query phrase or the suggested query phrase is not provided as a suggestion in context in the section of contiguous text.

If the search result selected in step 6035 is not the last of the multiple received search results ("no" branch of decision 6085), the process 6000 returns to step 6035 to select a different search result of the multiple received search results. If the search result selected in step 6035 is the last of the multiple received search results ("yes" branch of decision 6085), the system provides the multiple search results for presentation to a user (step 6090). In some implementations, steps 6035 through steps 6085 are not repeated for each received search result. For example, these steps can be repeated for a subgroup of the received search results, e.g., the subgroup of received search results that will be provided for presentation to the user on a first page of search results.

In some implementations, if the search result selected in step 6035 is the last of the multiple received search results ("yes" branch of decision 6085), the system ranks the search results using the similarity measures for the clauses (step 6088). For example, the search results can be ranked by the similarity measures for the clauses or by combining the similarity measures with the search engine's general ranking function (e.g., using a weighted combination). Following optional step 6088, the system provides the multiple search results for presentation to a user (step 6090).

Each search result includes the respective section of contiguous text, and each suggested query phrase included in a respective section of contiguous text is provided in context in the respective section of contiguous text. The suggested query phrase is associated with a user interface object, as described above. The system can cause the multiple search results including the contiguous sections to be transmitted to a client device 1004 for presentation to a user (step 6100), using conventional transmission techniques as described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a device with spoken language input, to name just a few. A smart phone is an example of a device with spoken language input, which can accept voice input (e.g., a user query spoken into a microphone on the device).

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. The techniques for identifying suggested query phrases can be used for other applications, for example, electronic book search or audio search (e.g., audio search of recorded radio programs).

What is claimed is:

1. A computer-implemented method comprising:
receiving a search query;
obtaining one or more search results responsive to the search query, wherein a first search result of the one or more search results identifies a resource including text;
computing a respective similarity measure between the search query and each of a plurality of contiguous portions of text of the resource;
selecting a suggested query phrase from a first contiguous portion of text of the resource having a highest computed similarity measure with the search query;
generating a first search result snippet to be presented as part of the first search result in a presentation of the one or more search results, wherein the first search result snippet presented as part of the first search result includes the suggested query phrase as a selectable user interface element for a user to submit the suggested query phrase as a new search query; and
providing the presentation of the one or more search results, including the first search result snippet as part of the first search result, in response to the search query.

2. The method of claim 1, wherein generating the first search result snippet to be presented as part of the first search result in the presentation of the one or more search results comprises visually distinguishing the suggested query phrase from other text in the first search result snippet.

3. The method of claim 2, wherein visually distinguishing the suggested query phrase from other text in the first search result snippet comprises bolding, highlighting, or underlining the suggested query phrase in the first search result snippet.

4. The method of claim 1, further comprising:
determining that the query satisfies one or more conditions, wherein selecting the suggested query phrase from text of the resource comprises selecting the suggested query phrase from text of the resource in response to determining that the query satisfies the one or more conditions.

5. The method of claim 4, wherein determining that the query satisfies one or more conditions comprises:
providing the query as input to a natural language parser; and
determining from output of the natural language parser that the query has a natural language structure.

6. The method of claim 4, wherein determining that the query satisfies one or more conditions comprises:
determining a number of terms in the query; and
determining that the number of terms in the query exceeds a predetermined value.

7. The method of claim 1, wherein computing a respective similarity measure between the search query and each of a plurality of contiguous sections of text of the resource comprises:
identifying a plurality of clauses in the text of the resource; and
computing a respective similarity measure between the search query and each clause in the plurality of clauses.

8. The method of claim 1, wherein computing a respective similarity measure between the search query and each of a plurality of contiguous sections of text of the resource comprises:
identifying a plurality of sentences in the text of the resource; and
computing a respective similarity measure between the search query and each sentence in the plurality of sentences.

9. The method of claim 1, in which the user interface element is one of a hyperlink, a button, or a check box.

10. The method of claim 1, in which the resource is a PDF document, an HTML document, an XML document, a word processing document, or a plain text document.

11. A computer-implemented method comprising:
receiving a query;
obtaining one or more search results responsive to the query, wherein each search result identifies a respective resource,
each respective resource including text;
processing each of the one or more search results, including:
identifying a plurality of clauses in the text of a respective resource identified by the search result, and
calculating a similarity measure for each clause in the plurality of clauses, the similarity measure for a clause being a measure of the similarity between the clause and the query;
determining that a first clause within a first resource identified by a first search result of the one or more search results has a similarity measure with the query that satisfies a threshold;
in response to determining that a first clause within a first resource identified by a first search result of the one or more search results has a similarity measure with the query that satisfies a threshold, selecting the first clause as a suggested query phrase for the query;
generating a search result snippet to be presented as part of the first search result in a presentation of the one or more search results, wherein the search result snippet includes the suggested query phrase as a selectable user interface element within the selected contiguous portion of the text of the resource, wherein user selection of the suggested query phrase within the search result snippet invokes the suggested query phrase as a new query; and
providing the presentation of the one or more search results, including the search result snippet as part of the first search result, in response to the query.

12. The method of claim 11, further comprising:
determining that the query satisfies one or more conditions, wherein processing each of the one or more search results comprises processing each of the one or more search results in response to determining that the query satisfies the one or more conditions.

13. The method of claim 12, in which determining that the query satisfies one or more conditions further comprises:
determining a number of terms in the query; and
determining that the number of terms in the query exceeds a predetermined value.

14. The method of claim 12, in which determining that the query satisfies one or more conditions further comprises:
determining that the query has a natural language structure.

15. The method of claim 11, in which identifying the plurality of clauses in the text of the respective resource further comprises:
identifying one or more of capitalization, abbreviation, or lexical features in the respective resource.

16. The method of claim 11, in which calculating the similarity measure for a clause in the plurality of clauses further comprises:
calculating the similarity measure using a function that weights a word in the query that is missing from the clause differently from a word in the clause that is missing from the query.

17. The method of claim 11, further comprising:
adjusting a ranking of the one or more search results according to respective similarity measures of clauses identified as suggested query phrases.

18. A computer-implemented method comprising:
receiving a search query;
obtaining one or more search results responsive to the search query, wherein a first search result of the one or more search results identifies a resource including text;
analyzing the text of the resource to identify a contiguous portion of text of the resource using a computed histogram of words in the text of the resource, the contiguous portion of text being a phrase in the resource characteristic of the resource and not identical to the query;
selecting a suggested query phrase from the contiguous portion of the text of the resource;
generating a first search result snippet to be presented as part of the first search result in a presentation of the one or more search results, wherein the first search result snippet presented as part of the first search result includes the suggested query phrase as a selectable user interface element for a user to submit the suggested query phrase as a new search query; and
providing the presentation of the one or more a plurality of search results, including the first search result snippet as part of the first search result, in response to the search query.

19. The method of claim 18, wherein generating the first search result snippet to be presented as part of the first search result in the presentation of the one or more search results comprises visually distinguishing the suggested query phrase from other text in the first search result snippet.

20. The method of claim 18, further comprising:
determining that the query satisfies one or more conditions that indicate that identifying a suggested query phrase would be beneficial, wherein computing a respective similarity measure between the search query and each of a plurality of contiguous portions of text of the resource comprises computing a respective similarity measure between the search query and each of a plurality of contiguous portions of text of the resource in response to determining that the query satisfies one or more conditions that indicate that identifying a suggested query phrase would be beneficial.

21. A system comprising:
one or more computers and one or more storage devices storing instructions that are operable, when executed by the one or more computers, to cause the one or more computers to perform operations comprising:
receiving a search query;
obtaining one or more search results responsive to the search query, wherein a first search result of the one or more search results identifies a resource including text;
computing a respective similarity measure between the search query and each of a plurality of contiguous portions of text of the resource;
selecting a suggested query phrase from a first contiguous portion of text of the resource having a highest computed similarity measure with the search query;
generating a first search result snippet to be presented as part of the first search result in a presentation of the one or more search results, wherein the first search result snippet presented as part of the first search result includes the suggested query phrase as a selectable user interface element for a user to submit the suggested query phrase as a new search query; and
providing the presentation of the one or more search results, including the first search result snippet as part of the first search result, in response to the search query.

22. The system of claim 21, wherein generating the first search result snippet to be presented as part of the first search result in the presentation of the one or more search results comprises visually distinguishing the suggested query phrase from other text in the first search result snippet.

23. The system of claim 22, wherein visually distinguishing the suggested query phrase from other text in the first search result snippet comprises bolding, highlighting, or underlining the suggested query phrase in the first search result snippet.

24. A system comprising:
one or more computers and one or more storage devices storing instructions that are operable, when executed by the one or more computers, to cause the one or more computers to perform operations comprising:
receiving a query;
obtaining one or more search results responsive to the query, wherein each search result identifies a respective resource, each respective resource including text;
processing each of the one or more search results, including:
identifying a plurality of clauses in text of a respective resource identified by the search result, and
calculating a similarity measure for each clause in the plurality of clauses, the similarity measure for a clause being a measure of the similarity between the clause and the query;
determining that a first clause within a first resource identified by a first search result of the one or more search results has a if the similarity measure with the query that satisfies a threshold;
in response to determining that a first clause within a first resource identified by a first search result of the one or more search results has a similarity measure with the query that satisfies a threshold, selecting the first clause as a suggested query phrase for the query;
generating a search result snippet to be presented as part of the first search result in a presentation of the one or more search results, wherein the search result snippet includes the suggested query phrase as a selectable user interface element within the selected contiguous portion of the text of the resource, wherein user selection of the suggested query phrase within the search result snippet invokes the suggested query phrase as a new query; and
providing the presentation of the one or more search results, including the search result snippet as part of the first search result, in response to the query.

25. The system of claim 24, wherein generating the search result snippet to be presented as part of the first search result in a presentation of the one or more search results comprises visually distinguishing the suggested query phrase from other text in the search result snippet.

26. The system of claim 25, wherein visually distinguishing the suggested query phrase from other text in the search result snippet comprises bolding, highlighting, or underlining the suggested query phrase in the search result snippet.

27. A system comprising:
one or more computers and one or more storage devices storing instructions that are operable, when executed by the one or more computers, to cause the one or more computers to perform operations comprising:
receiving a search query;
obtaining one or more search results responsive to the search query, wherein a first search result of the one or more search results identifies a resource including text;
analyzing the text of the resource to identify a contiguous portion of text of the resource using a computed histogram of words in the text of the resource, the contiguous portion of text being a phrase in the resource characteristic of the resource and not identical to the query;
selecting a suggested query phrase from the contiguous portion of the text of the resource;
generating a first search result snippet to be presented as part of the first search result in a presentation of the one or more search results, wherein the first search result snippet presented as part of the first search result includes the suggested query phrase as a selectable user interface element for a user to submit the suggested query phrase as a new search query; and
providing the presentation of the one or more search results, including the first search result snippet as part of the first search result, in response to the search query.

28. The system of claim 27, wherein generating the first search result snippet to be presented as part of the first search result in the presentation of the one or more search results comprises visually distinguishing the suggested query phrase from other text in the first search result snippet.

29. The method of claim 1, wherein computing a similarity measure between the search query and each of the plurality of contiguous portions of text of the resource comprises:
identifying one or more linguistic relations between two or more terms in the query and two or more terms in the contiguous portion of text; and
computing the similarity measure based on the linguistic relations between the two or more terms in the query and the two or more terms in the contiguous portion of text.

30. The method of claim 1, wherein computing a similarity measure between the search query and each of the plurality of contiguous portions of text of the resource comprises:
evaluating occurrences of n-gram sequences in the query and n-gram sequences in the contiguous portion of text; and
computing the similarity measure based on the occurrences of n-gram sequences in the query and n-gram sequences in the contiguous portion of text.

* * * * *